United States Patent
McBrearty et al.

(10) Patent No.: US 9,549,069 B2
(45) Date of Patent: Jan. 17, 2017

(54) SYSTEM AND METHOD FOR GENERATING A CALL REPORT

(71) Applicant: Veeva Systems Inc., Pleasanton, CA (US)

(72) Inventors: Krista McBrearty, Pleasanton, CA (US); Uri Reich, Hamden, CT (US); Arno Sosna, Pleasanton, CA (US); Ted Wallach, Cherry Hill, NJ (US); Edward Gee, Walnut Creek, CA (US); Weiwei Jia, Pleasanton, CA (US); David Wright, Pleasanton, CA (US); Jing Zhuang, Danville, CA (US)

(73) Assignee: Veeva Systems Inc., Pleasanton, CA (US)

(*) Notice: Subject to any disclaimer, the term of this patent is extended or adjusted under 35 U.S.C. 154(b) by 23 days.

(21) Appl. No.: 14/700,139

(22) Filed: Apr. 29, 2015

(65) Prior Publication Data

US 2016/0323448 A1   Nov. 3, 2016

(51) Int. Cl.
*H04M 3/00* (2006.01)
*H04M 5/00* (2006.01)
*H04M 3/51* (2006.01)

(52) U.S. Cl.
CPC ................. *H04M 3/5183* (2013.01)

(58) Field of Classification Search
CPC ..................................... H04M 3/5183
USPC ..................... 379/265.09, 265.01, 309
See application file for complete search history.

(56) References Cited

U.S. PATENT DOCUMENTS

2010/0280962 A1* 11/2010 Chan ............... G06Q 10/103
                                                          705/301
2015/0347966 A1* 12/2015 Saunders ......... G06Q 10/10
                                                          705/342

* cited by examiner

*Primary Examiner* — Quynh Nguyen

(57) ABSTRACT

Systems and methods for generating call reports which may allow access to the child call for each selected attendee via the group call, and enable users to capture data and make edits to detailing and sampling information unique to each attendee directly in the child call. Access to controls within the attendees section may enable mass entry of supported activities for a subset of attendees.

20 Claims, 24 Drawing Sheets

Attendees 520

- ☐ Doe, John
- ☐ Ashworth, Teri
- ☐ Smith, Bill
- ☑ Edwards, Stephanie
- ☐ Jones, Sally
- ☐ Thomas, Tom

[Add All] [Remove All] 503 [Search] 504

- ☑ Adams, Marilyn
- ☐ Doe, Jane
- ☐ Johnson, Bob
- ☐ Smith, Sue
- ☑ Williams, Joshua

- ☐ Lewis, Lucy
- ☐ Johnson, Sam
- ☐ Jones, Mary
- ☑ Goldberg, Robert
- ☐ Wright, Chris

501

502 — 505 —

[Record Details] 523 [Record Samples] 524 [Media] 525 [Sign] 526

- 👥 Adams, Marilyn
- 👥 Edwards, Stephanie
- 👥 Goldberg, Robert
- 👥 Williams, Joshua

Attendees

[Add All] [Remove All] [Search]

☐ Doe, John
☐ Ashworth, Teri
☐ Smith, Bill
☑ Edwards, Stephanie
☐ Jones, Sally
☐ Thomas, Tom ☑ Adams, Marilyn
☐ Doe, Jane
☐ Johnson, Bob
☐ Smith, Sue
☑ Williams, Joshua ☐ Lewis, Lucy
☐ Johnson, Sam
☐ Jones, Mary
☑ Goldberg, Robert
☐ Wright, Chris

[Record Details] [Record Samples]

Adams, Marilyn

⊗ There is an error you need to fix. — 603

Edwards, Stephanie  [💬 3]  [🔒 4] — 602
601

Goldberg, Robert  [🔒 3]

Williams, Joshua

[✍ Signature Required]  [✍ Signed] — 604  [🔒 2]

FIG. 6D

Attendees

[Add All] [Remove All] [Search]

☑ Doe, John
☐ Ashworth, Teri
☐ Smith, Bill
☑ Edwards, Stephanie
☐ Jones, Sally
☐ Thomas, Tom ☑ Adams, Marilyn
☐ Doe, Jane
☐ Johnson, Bob
☐ Smith, Sue
☑ Williams, Joshua ☐ Lewis, Lucy
☐ Jones, Mary

[Cancel] [Select All] — 703 [Next] — 704

Adams, Marilyn
⟳ Edwards, Stephanie
⟳ Goldberg, Robert
⟳ Williams, Joshua

Attendees

| Add All | Remove All | Search |

- ☐ Doe, John
- ☑ Ashworth, Teri
- ☐ Smith, Bill
- ☐ Edwards, Stephanie
- ☐ Jones, Sally
- ☐ Thomas, T...

- ☐ Adams, Marilyn
- ☐ Doe, Jane
- ☐ Johnson, Bob
- ☐ Smith, Sue
- ☐ Williams, Joshua

- ☐ Lewis, Lucy
- ☐ Johnson, Sam
- ☑ Jones, Mary
- ☐

703

| Select All | Next | — 704

702 — Ca... Ashworth, Teri

Field ▶   Field
Field ▶   Field
                    721

🅥 Goldberg, Robert

Field ☑   Field
Field ☑   Field

| | | |
|---|---|---|
| Cancel | Record Details | Save |
| Add Attendee | | |
| ☑ Edwards, Stephanie | ☑ Williams, Joshua | |

Detailing Priority

| ☑ Coldcap | ☐ Labyrinth | ☑ Restalot 4 |
|---|---|---|
| ☐ Supero | ☐ Zuludox | |

⊕ Restalot 4
⊕ Coldcap

Add Section

Field [Value]   Field [Value]
Field [Value]   Field ☐

Key Messages

General Comment ⊕

| | Product | Name | Description |
|---|---|---|---|
| ⊖ | General Comment | Schedule Future Call | Scheduled a call for the future |

Coldcap ⊕
Restalot 4 ⊕

| Record Details | Existing Child Call Details | Updated Child Call Details |
|---|---|---|
| Detailing Priority | | |
| Stephanie Edwards, Joshua Williams | N/A | Stephanie Edwards<br><br>DP 1: Coldcap<br>DP 2: Labyrinth<br><br>Joshua Williams<br><br>DP 1: Restalot 4<br>DP 2: Coldcap<br>DP 3: Labyrinth |
| DP 1: Coldcap<br>DP 2: Labyrinth | DP 1: Restalot 4 | |
| Product Discussions | | |
| Stephanie Edwards, Joshua Williams | N/A | Stephanie Edwards<br><br>PD: Coldcap, Indication: Migraine<br>PD: Labyrinth, Indication: Anxiety<br><br>Joshua Williams<br><br>PD: Restalot 4, Indication: Insomnia<br>PD: Coldcap, Indication: Migraine<br>PD: Labyrinth, Indication: Anxiety |
| PD: Coldcap, Indication: Migraine<br>PD: Labyrinth, Indication: Anxiety | PD: Restalot 4, Indication: Insomnia | |

FIG. 8C

Attendees

| Add All | Remove All | Search |

- ☐ Doe, John
- ☐ Ashworth, Teri
- ☐ Smith, Bill
- ☑ Edwards, Stephanie
- ☐ Jones, Sally
- ☐ Thomas, Tom

- ☑ Adams, Marilyn
- ☐ Doe, Jane
- ☐ Johnson, Bob
- ☐ Smith, Sue
- ☑ Williams, Joshua

- ☐ Lewis, Lucy
- ☑ Jones, Mary

903

| Cancel | Select All | Next | — 904

- ◯ Adams, Marilyn
- ◯ Edwards, Stephanie
- ✗ Goldberg, Robert
- ◯ Williams, Joshua

| Media | | | | |
|---|---|---|---|---|
| Presentation Name | Product | Message | Description | Reaction |
| Coldcap Red | Coldcap | Introduction | Introduction Slide | Positive ▼ |
| Coldcap Rep | Coldcap 1140 | Efficacy vs. Competing treatments | Show the clinical results of Coldcap compared to competing treatments that claim the same indications | -- None -- ▼ |

Call Objectives

☑ Coldcap Launch 6 Month Checkpoint  ☐ Coldcap Launch 1 Year Checkpoint  ☐ Coldcap Launch 18 Month Checkpoint ☑ Restalot 4 Launch 1 Year Checkpoint  ☐ Restalot 4 Launch 18 Month Checkpoint

[ Add Other ]

⊖ Coldcap Launch 6 Month Checkpoint

Field [ Value ]     Field [ Value ]

⊖ Restalot 4 Launch 1 Year Checkpoint

Field [ Value ]     Field [ Value ]

PI (0)

☐ Coldcap Package Insert Update August 2014  ☐ Restalot 4 Package Insert Side Effects Amendment July 2014  ☐ Supero PI Update June 2014

☐ Zuludox Package insert Amendment July 2014

[ Add Other ]

1150

Samples And Promotional Items

Samples ⊕

| Product | Lot | Quantity | |
|---|---|---|---|
| ⊖ Coldcap 20mg | C2345678 ▼ | 15 ▼ | 🗍 |
| ⊖ Coldcap 50mg | c8901g23 ▼ | 15 ▼ | 🗍 |

| Product | Ship To Address | Quantity | |
|---|---|---|---|
| ⊖ Coldcap BRC | ▼ | 15 ▼ | |
| ⊖ Labyrinth BRC | 123 Main St. Philadelphia, PA 19130 | 15 ▼ | |

SYSTEM AND METHOD FOR GENERATING A CALL REPORT

BACKGROUND

The subject technology relates generally to customer relationship management ("CRM"), and more particularly to generating a call report in a customer relationship management system.

In the pharmaceutical sales industry, sales representatives are required to use call reports to record meetings and other interactions with doctors, including face-to-face meetings and discussions via phone or the Internet, and the call reports need to include the doctors' professional information, the medical products discussed, the materials shown to the doctors, the samples left, etc. Non-compliant call reports may expose company employers (e.g., a pharmaceutical company) to regulatory penalties or other legal liabilities. Thus, it is desirable to enable sales representatives to prepare call reports efficiently and their company employers to use data in the call reports effectively, especially when a sales representative talks to many doctors at one organization.

SUMMARY

The disclosed subject matter relates to a method for generating a call report, which comprises: displaying an attendee selection user interface ("UI") in response to selection of a group account from a customer relationship management system, wherein the attendee selection user interface comprises two or more members who are associated with the group account, and wherein the customer relationship management system stores account information for each of the two or more members. The method further comprises: in response to an input on the attendee selection user interface, displaying a first call user interface which displays a first and second attendees selected for the call, and a first button for the call, wherein the first and second attendees are selected from the two or more members. The method further comprises: displaying a second call user interface in response to an input on the first button for the call, wherein the second call user interface comprises an area for receiving information unique to the first and second selected attendees, and wherein the information unique to the first and second selected attendees is about one or more products discussed during one or more meetings with the first and second selected attendees. The method also comprises: sending the information unique to the first and second selected attendees to the customer relationship management system to update only the first and second selected attendees' call information in the customer relationship management system.

BRIEF DESCRIPTION OF THE DRAWINGS

FIGS. 5A, 5B and 5C each illustrates an example user interface ("UI") for an attendee selection section according to one embodiment of the present invention.

FIGS. 6A, 6B, 6C and 6D each illustrates an example UI for the attendee table area according to one embodiment of the present invention.

FIGS. 7A and 7B each illustrates an example UI for selecting attendees for a mass detailing process according to one embodiment of the present invention.

FIGS. 8A and 8B each illustrates an example UI for recording mass details according to one embodiment of the present invention.

FIG. 8C illustrates an example for updating attendee call information according to one embodiment of the present invention.

FIGS. 9A and 9B each illustrates an example UI for selecting attendees for a mass sampling process according to one embodiment of the present invention.

Figure 10:
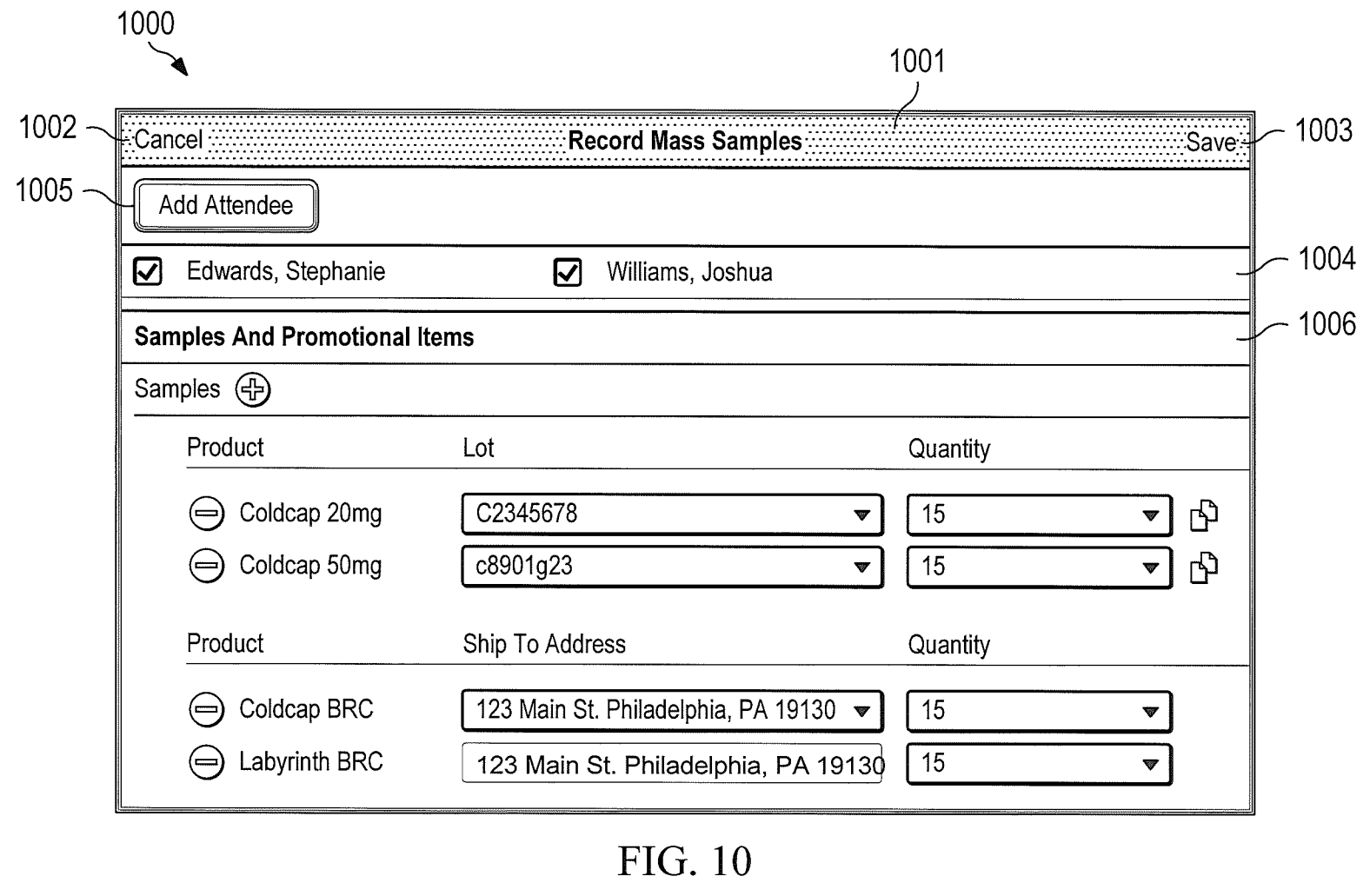

FIG. 10 illustrates an example UI for recording mass samples according to one embodiment of the present invention.

FIG. 11A and FIG. 11B illustrate an example UI for a child call report according to one embodiment of the present invention.

DETAILED DESCRIPTION

Figure 1:
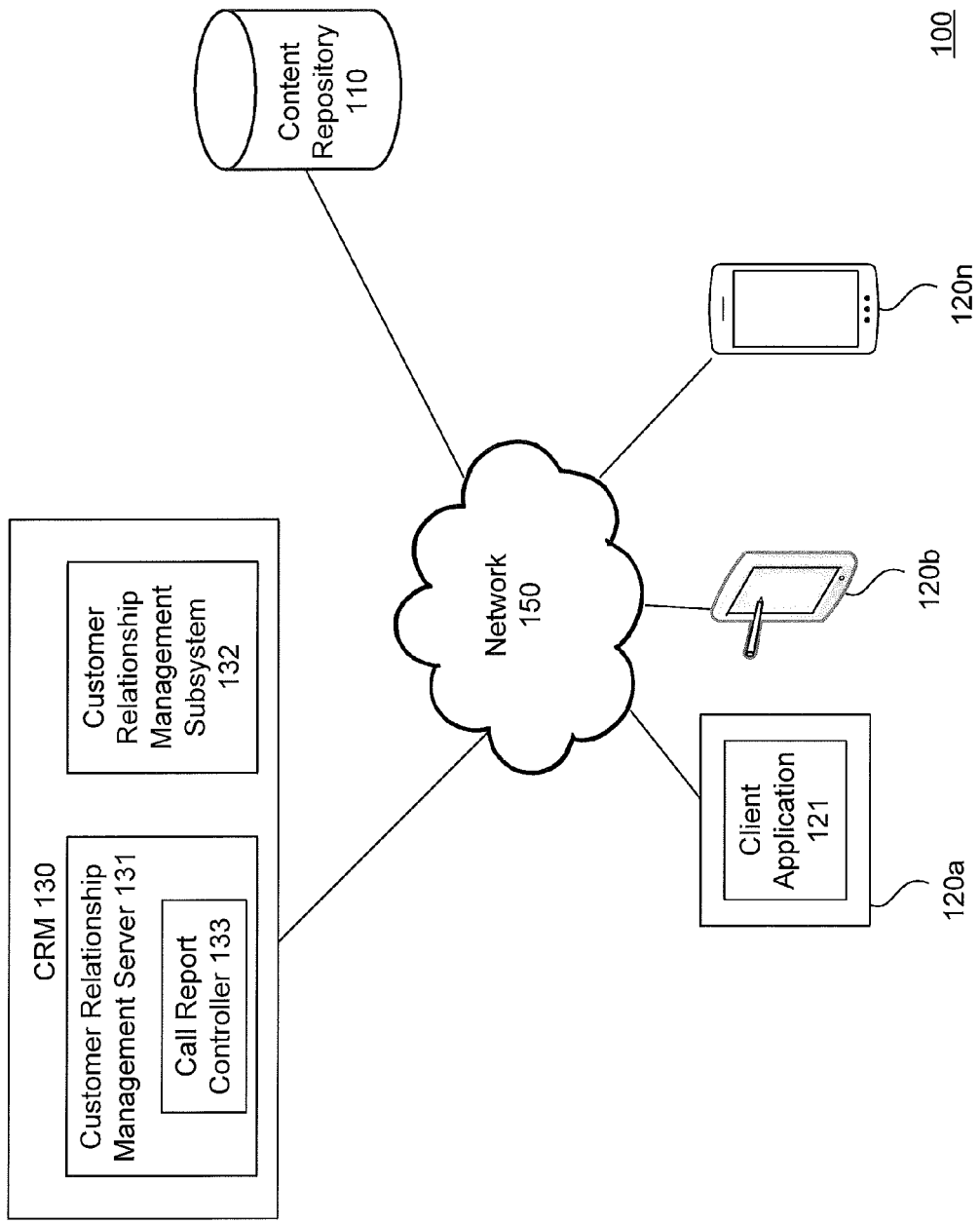
FIG. 1 illustrates an example high level block diagram of a customer relationship management architecture wherein the present invention may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for generating call reports for meetings with doctors, or health care practitioners. For sales representatives that call on group accounts (e.g., a hospital or a healthcare practice group), many times they speak to multiple individual accounts (e.g., doctors) throughout their visits, and oftentimes have different discussions with each. Also, different quantities of different samples are generally left with more than one doctor. Recording these meetings as multiple individual calls may be labor intensive for the sales representatives, or users. It may be also inefficient for a sales representative's company employer (e.g., a pharmaceutical company) if it chooses to capture all of these activities at a group level. In order to allow for more accurate recording and reporting of field activities, the present invention allows sales representatives to capture unique detailing and sampling information for each doctor, marked as an attendee, on a call to a group account, or a group call. The present invention also allows sales representatives to capture detailing and sampling information unique to a subset of the doctors. The group account may act as a hub to capture the main information of the group call, which consists of a parent call and one or more child calls. A parent call is created from the group call to capture the information common to the group account and also to contain a summary of the information recorded against all individual accounts in the group account (i.e., doctors). Child calls may be created from the group call to capture the information recorded against a subset of individual account or specific to each individual account associated with the group account. Thus, detailing and sampling information unique to each attendee can be recorded against him/her on the group call, and detailing and sampling information common to a subset of attendees can be recorded against this subset of attendees on the group call. Call objectives specific to each attendee can be completed against the respective attendees on their child calls as well. The detailing and sampling information unique to each attendee may include, e.g., call details, discussions, key messages, media shown, and samples.

FIG. 1 illustrates an example high level block diagram of a customer relationship management architecture 100 wherein the present invention may be implemented. As shown, the architecture 100 may include a content repository 110, a plurality of user computing devices 120a, 120b, . . . 120n, and a CRM 130, coupled to each other via a network 150. The CRM 130 may include a customer relationship management server 131, and a customer relationship management subsystem 132. The customer relationship management server 131 may further include a call report controller 133. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 130 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access the CRM 130 via the network 150. User computing devices 120a-120n are illustrated in more detail in FIG. 3.

The content repository 110 may store content that a user (e.g., a sales representative) may access via client applications (e.g., 121) in user computing devices 120a-120n and show to a doctor, and may be any commercially available storage devices. In an embodiment, the content repository 110 is a cloud-based or distributed network based system for consolidating an enterprise's data, oftentimes integrating multiple content repositories in an enterprise into a single system having coordinated control, measuring, and auditing of data creation, access and distribution. In an embodiment, this content repository 110 may include specific data collections for the life sciences industry, although it may store content for other industries. In one embodiment, the content repository 110 may provide an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL).

The customer relationship management server 131 is typically a remote computer system accessible over a remote or local network, such as the network 150, and may provide access to the customer relationship management subsystem 132. The customer relationship management server 131 could be any commercially available computing devices. A client application (e.g., 121) process may be active on one or more user computing devices 120a-120n. The corresponding server process may be active on the customer relationship management server 131. The client application process and the corresponding server process may communicate with each other over the network 150, thus providing distributed functionality and allowing multiple client applications to take advantage of the information-gathering capabilities of the CRM 130.

In one implementation, the customer relationship management server 131 may include a call report controller 133 which may control the process for generating a call report, as will be described with reference to FIGS. 12A, 12B and 12C below.

Although the customer relationship management server 131 and the call report controller 133 are shown in one server, it should be understood that they may be implemented in multiple servers.

In one implementation, the customer relationship management subsystem 132 contains all contact information that may be available to users. In addition to storage of contact information, the customer relationship management subsystem 132 may also be capable of storing configurations regarding specific preferences, regulatory limitations and requirements, and other fields that will facilitate communications, in general or on a by-recipient basis.

In one implementation, the customer relationship management subsystem 132 is capable of communication with multiple sources through the customer relationship management server 131 or through other channels to maintain a current and accurate collection of information regarding customer accounts, which may include group accounts and individual accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer accounts. In this manner, the customer relationship management subsystem 132 pulls the approved version of what represents an account, which may be a hospital or physician, which then pulls from multiple networks to ensure that the information regarding an account is up-to-date.

The customer relationship management subsystem 132 may be operated by a third party.

In one implementation, the CRM 130 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 130.

Although the embodiments are described with a customer relationship management subsystem 132, the customer information and content may be from other types of information management systems, e.g., a Closed Loop Marketing (CLM) system.

In one embodiment, the CRM 130 may run on a cloud computing platform. Users can access content on the cloud independently by using a virtual machine image, or purchasing access to a service maintained by a cloud database provider. The customer relationship management subsystem 132 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 130 may be provided as Software as a Service ("SaaS") to allow users to access it with a thin client.

Figure 2:
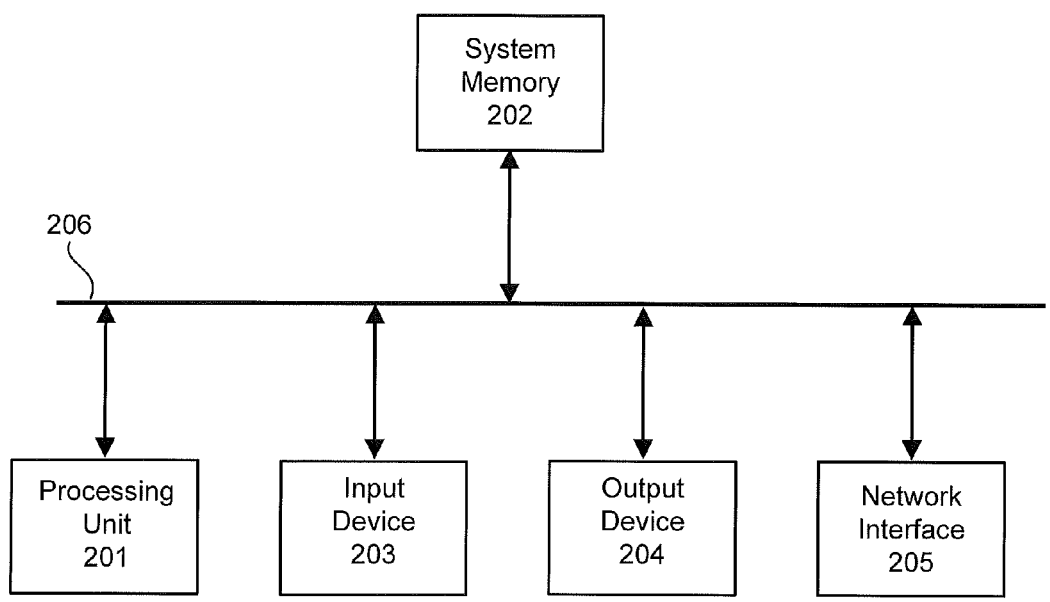
FIG. 2 illustrates an example block diagram of a computing device.

FIG. 2 illustrates an example block diagram of a computing device 200 which can be used as the user computing devices 120a-120n, and the customer management relationship server 131 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
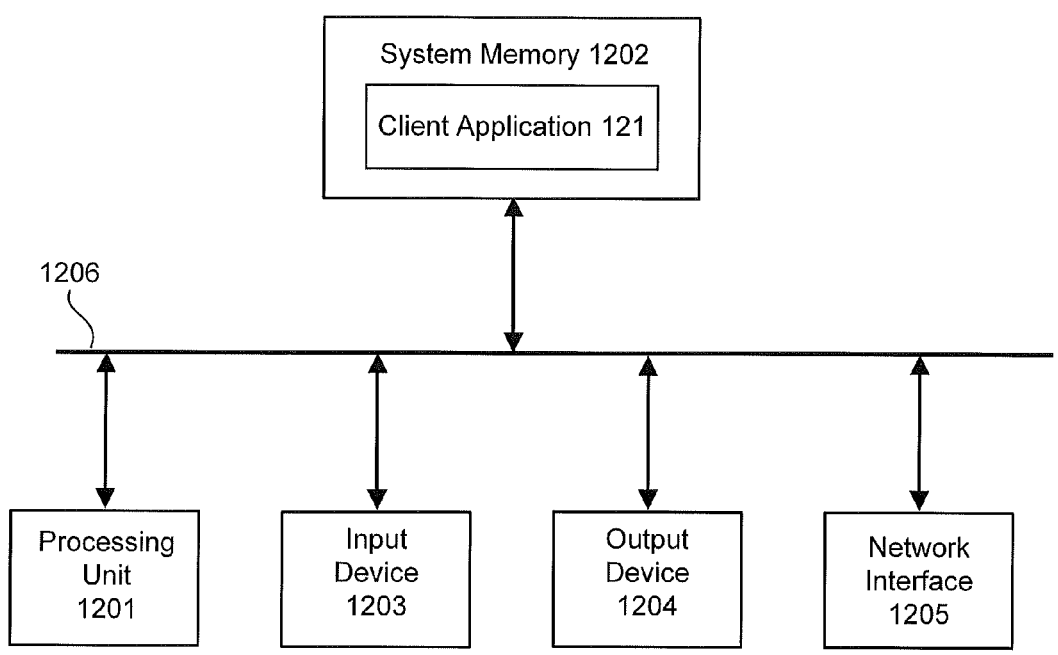
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The system memory 1202 may store the client application 121.

Figure 4:
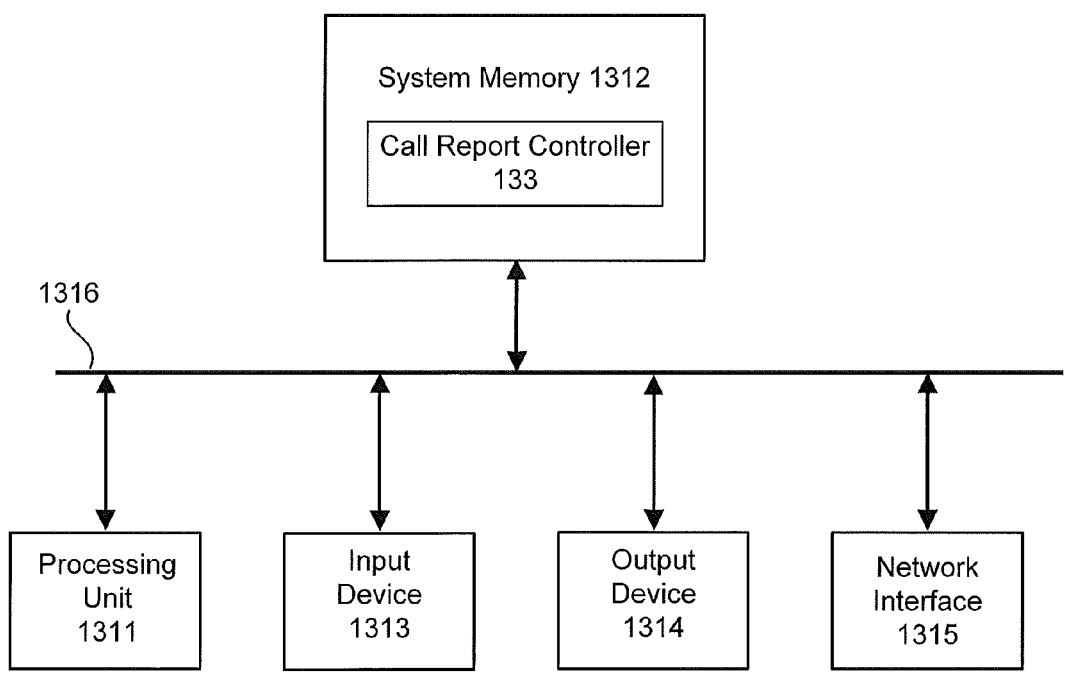
FIG. 4 illustrates an example high level block diagram of the customer relationship management server according to one embodiment of the present invention.

FIG. 4 illustrates an example high level block diagram of the customer relationship management server 131 according to one embodiment of the present invention. The customer relationship management server 131 may be implemented by the computing device 200, and may have a processing unit 1311, a system memory 1312, an input device 1313, an output device 1314, and a network interface 1315, coupled to each other via a system bus 1316. The system memory 1312 may store the call report controller 133.

Figure 5A:
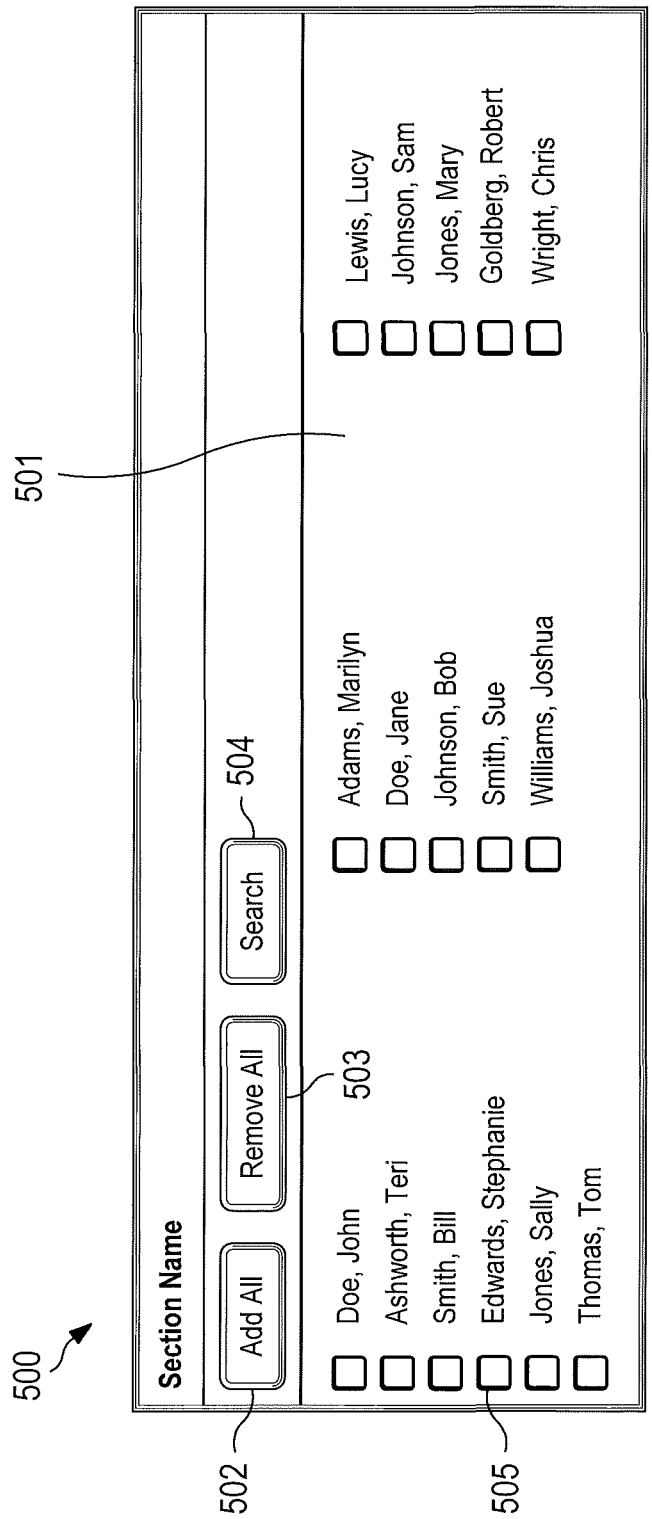
Figure 5C:
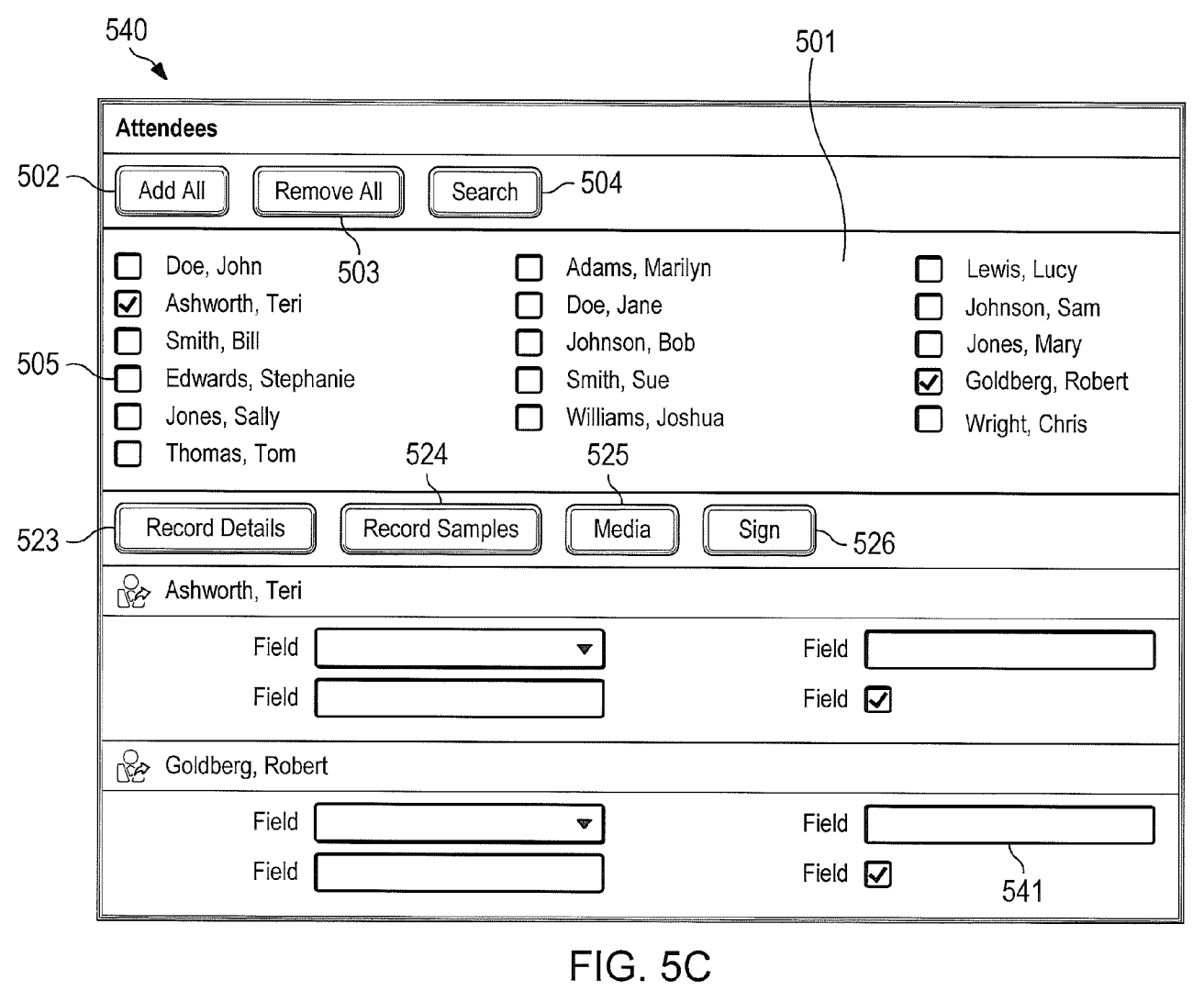

FIGS. 5A, 5B and 5C each illustrates an example user interface ("UI") for an attendee selection section according to one embodiment of the present invention. The UI may be a graphical user interface ("GUI"). User input may be completed via a UI or an Application Programming Interface ("API"). The UI 500 in FIG. 5A may be displayed when the user selects a group account from the customer relationship management subsystem 132 to start a call report for a group call. As shown, names of doctors in a healthcare practice group may be displayed in an attendees section area 501 on the UI 500. The user may click on an "Add All" button 502 to select all doctors as attendees of a group call, click on a "Remove All" button 503 to remove all selected doctors from a group call, or click on a "Search" button 504 to search for a doctor. In addition, there is a checkbox 505 before the name of each doctor. The user may click on the checkbox 505 to add the corresponding doctor to a group call, or uncheck the checkbox 505 to remove the corresponding doctor from a group call.

When the user selects a doctor, the doctor's name may be displayed in an attendee row in an attendees table area 521 on a parent call UI 520, as shown in FIG. 5B. A child call button 522 may be displayed to the left of each attendee. The user may tap or click on the child call button 522 or anywhere on the attendee row to open a child call report UI 1100 for the corresponding attendee, which will be described in detail below with reference to FIG. 11.

The parent call UI 520 may have a Record Details button 523. The user may click on the Record Details button 523 to begin a mass detailing process which will be described in detail below with reference to FIGS. 7A, 7B, 8A, 8B and 8C.

The parent call UI 520 may have a Record Samples button 524. The user may click on the Record Samples button 524 to start a mass sampling process which will be described in detail below with reference to FIGS. 9A, 9B, and 10.

The parent call UI 520 may have a Media button 525. The user may click on the Media button 525 to begin showing digital media presentation to one or more attendees.

The parent call UI 520 may have a Sign button 526. The user may click on the Sign button 526 to capture signatures from one or more attendees electronically.

In one implementation, one or more attendee specific fields 541 may be displayed under each attendee row, as shown in FIG. 5C. The user may input attendee specific information in the attendee specific fields 541, such as an attendee's specialty and role. The attendee specific fields 541 to be displayed may be configured by the customer.

Figure 6C:
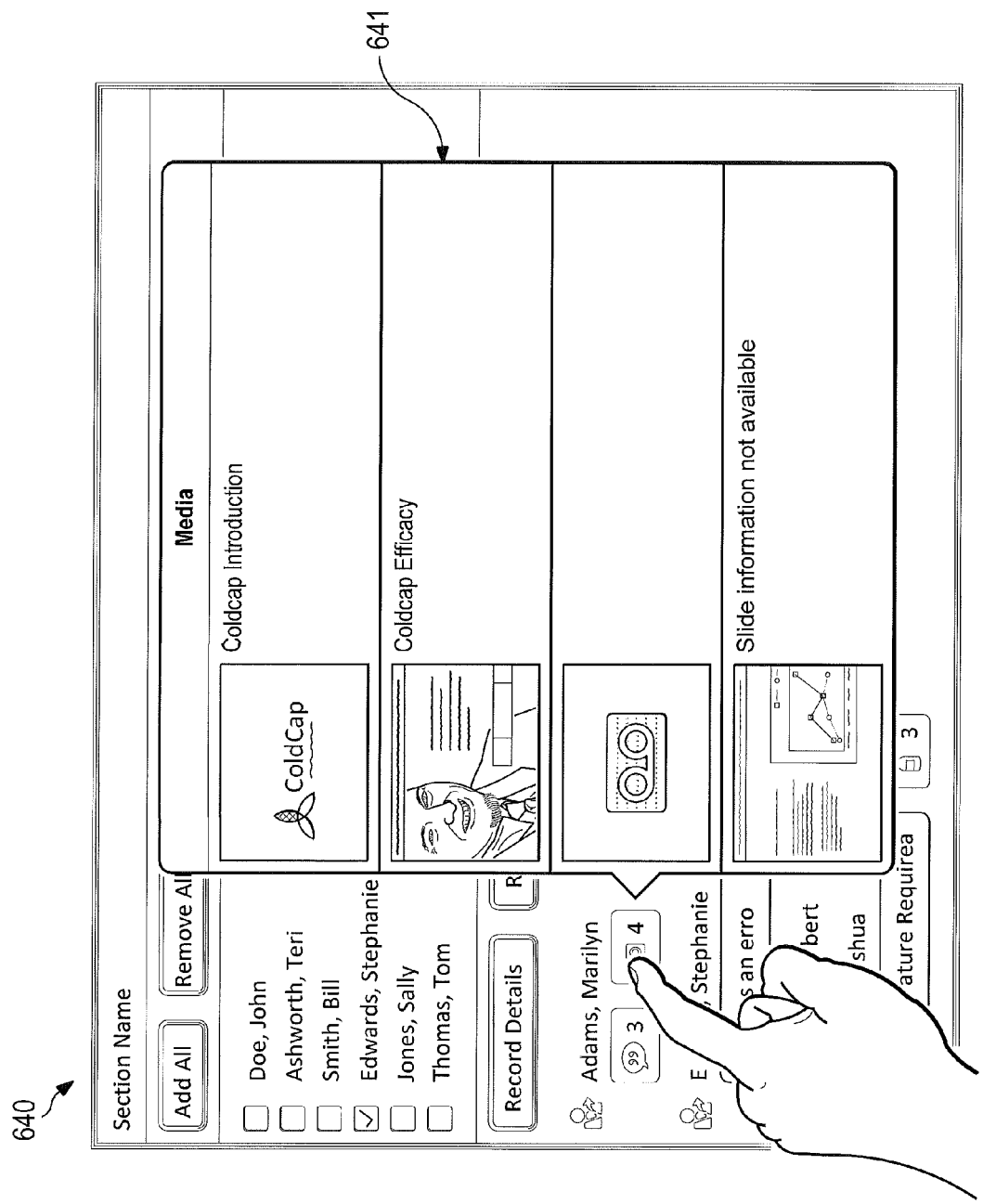

FIGS. 6A, 6B, 6C and 6D each illustrates an example UI for the attendee table area 521 according to one embodiment of the present invention. As shown in FIG. 6A, a product badge 601, a media badge 602, a sample badge 603 and a signature badge 604 may be displayed under an attendee's name (e.g., Dr. Stephanie Edwards) to summarize meetings with the attendee. In one implementation, quantity information about the products discussed, media shown and samples left may be displayed on the badges. For example, for Dr. Stephanie Edwards, 3 products were discussed, 4 media were shown, 3 samples were left, and her signature was acquired.

Figure 6D:
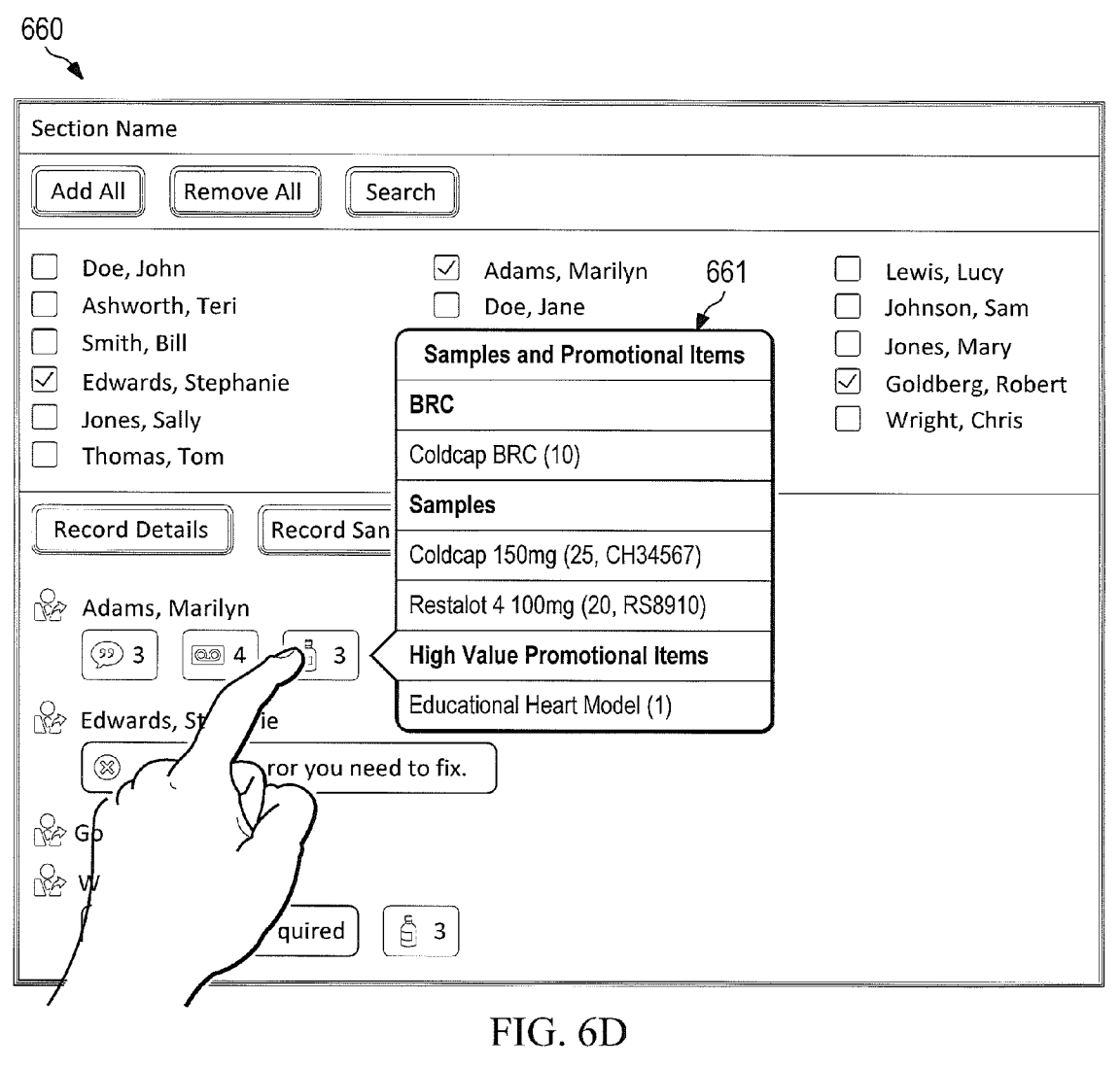

When there is a user input on the product badge 601 (e.g., a tap, click, or mouse over), a popup window 621 may be displayed to list the products detailed in priority order, as shown in FIG. 6B. When there is a user input on the media badge 602, a popup window 641 may be displayed to list media thumbnails and key message descriptions for the media presented (e.g., slides, video, and audio from the content repository 110) in the sequence they were shown, as shown in FIG. 6C. When there is a user input on the sample badge 603, a popup window 661 may be displayed to list the sampled products as shown in FIG. 6D. In one implementation, the samples are listed by product type, display order, then alphabetically. In one implementation, the quantity and lot may be shown in parentheses after the product name. When there is a user input on the signature badge 604, information about signatures acquired may be displayed.

Using the Record Details button 523 in the parent call UI 520 may allow the user to start to record mass details for a subset of selected attendees on the group call. FIG. 7A illustrates an example UI 700 for selecting attendees for a mass detailing process according to one embodiment of the present invention. When the user clicks on the Record Details button 523 on the parent call UI 520 in FIG. 5B, the attendees table shown in the attendees table area 521 may change to a multi-select list, one row for each attendee, and the child call buttons 522 next to the selected attendees may be replaced with multi-select checkboxes 701. In addition, the Record Details button 523, the Record Samples button 524, the Media button 525 and the Sign button 526 may be replaced with a Cancel button 702, a Select All button 703, and a Next button 704. The user may choose one or more attendees in the multi-select list for the mass detailing process. The user may add or remove attendees using the checkboxes 701 when the multi-select list is displayed. Selection of the Cancel button 702 may clear the multi-select checkboxes 701 and replace with the child call buttons 522, selection of the Select All button 703 may select all the checkboxes 701, and selection of the Next button 704 may open a mass detailing UI 800 over the UI 700. The Next button 704 may become active if at least one attendee is selected.

FIG. 7B illustrates an example UI 720 for entering attendee information for a mass detailing process according to one embodiment of the present invention. As shown, attendee specific fields 721 may be displayed for each attendee.

Figure 8B:
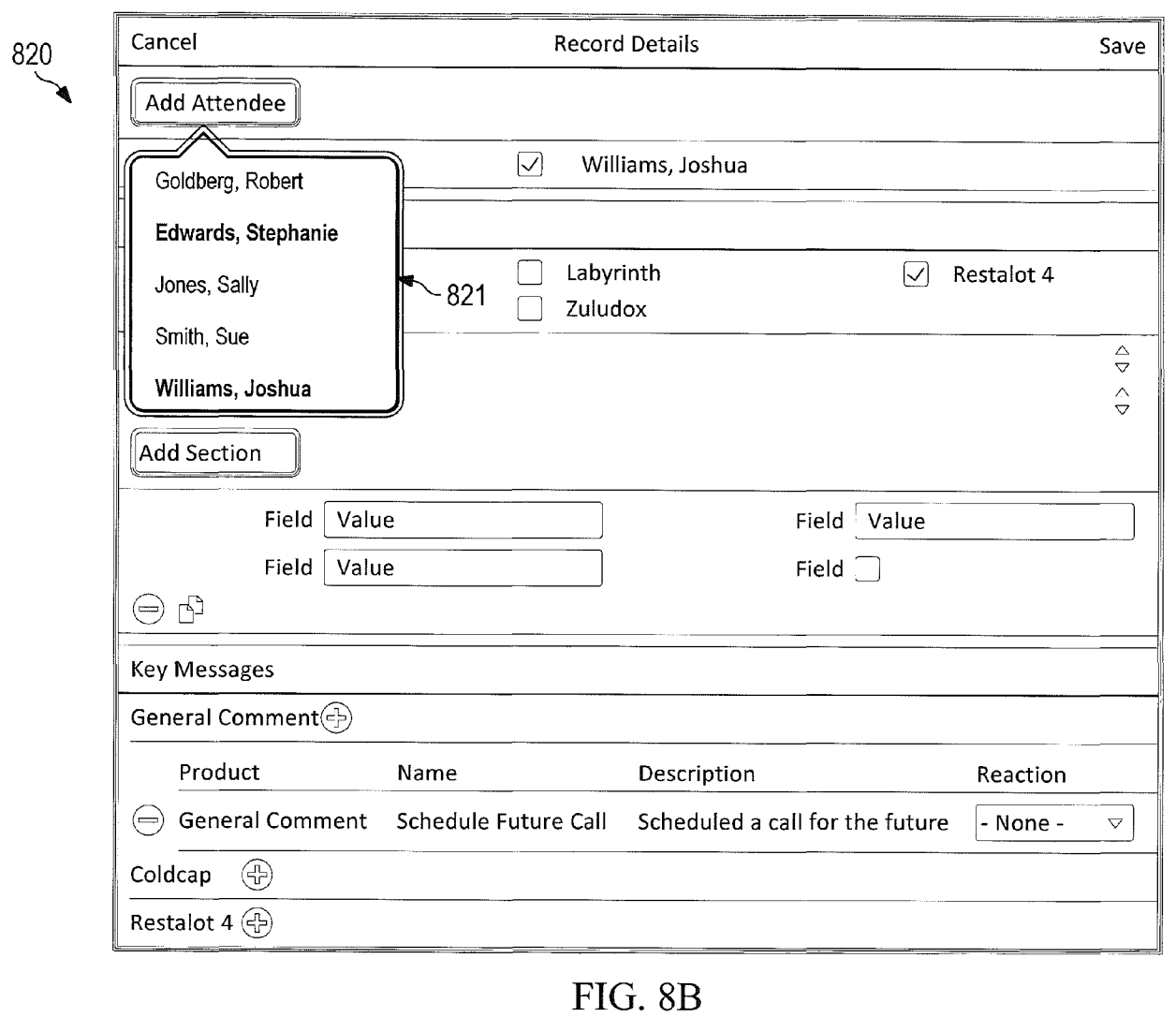

FIG. 8A illustrates an example UI 800 for recording mass details according to one embodiment of the present invention. The UI 800 may have a selected attendees section 804 which displays attendees selected via the multi-select checkboxes 701 in FIG. 7A (e.g., Dr. Stephanie Edwards and Dr. Joshua Williams). Checkboxes may be deselected for quick removal of an attendee. The UI 800 may include an Add Attendee button 805. When the Add Attendee button 805 is clicked on, a picklist 821 of all attendees on the group call may be opened to allow the user to select more attendees for the mass detailing process, as shown in FIG. 8B. Attendees already selected may be grayed out on the picklist.

The mass detailing UI 800 may include a detailing priority area 806, which may allow the user to add, remove and modify detailed products and detailing priority. The mass detailing UI 800 may also include a key message area 807, which may allow the user to add, remove and modify key messages (e.g., patient tolerability of a product and new indication of a product).

The mass detailing UI 800 may have a header 801 which may include the header name "Record Mass Details", a Cancel button 802, and a Save button 803. The user may click on the Cancel button 802 to close the mass detailing UI 800 without saving and return to the parent call UI 520. When the user clicks on the Save button 803, data captured on the mass detailing UI 800 (e.g., detailed products and detailing priority) may be stored in the customer relationship management subsystem 132, and applied to each of the selected attendees (e.g., Dr. Stephanie Edwards and Dr. Joshua Williams) on each respective child call so that their attendee specific information may be updated in the customer relationship management subsystem 132. If a child call report already exists for the attendee, the detail information may be updated, as shown in FIG. 8C. If a child call report does not exist for the attendee, a new child call report may be created for the attendee with the mass details when mass details are applied. The badges 601-604 shown in FIG. 6A may be updated accordingly.

Using the Record Samples button 524 on the parent call UI 520 may allow the user to record unique sampling information for a subset of selected attendees on the group call. FIG. 9A illustrates an example UI 900 for selecting attendees for a mass sampling process according to one embodiment of the present invention. When the user clicks on the Record Samples button 524 on the parent call UI 520 shown in FIG. 5B, the attendee table shown in the attendees table area 521 may change to a multi-select list, one row for each attendee, and the child call buttons 522 next to the selected attendees may be replaced with multi-selected checkboxes 901. In addition, the Record Details button 523, the Record Samples button 524, the Media button 525 and the Sign button 526 may be replaced with a Cancel button 902, a Select All button 903, and a Next button 904. The user may choose one or more attendees in the multi-select list for the mass sampling process. The user may add and remove attendees using the checkboxes 901 when the multi-select list is displayed. Selection of the Cancel button 902 may clear the multi-select checkboxes 901 and replace with the child call buttons 522, selection of the Select All button 903 may select all the checkboxes 901, and selection of the Next button 904 may open a mass sampling UI 1000, as shown in FIG. 10, over the UI 900. The Next button 904 may become active if at least one attendee is selected.

A sample status indicator 905 may appear to the left of the attendee name to indicate if the attendee is eligible to receive samples. If samples are locked down for an attendee (e.g., has a signature), this particular attendee (e.g., Dr. Robert Goldberg) may not be selected for the mass sampling process.

Figure 9B:
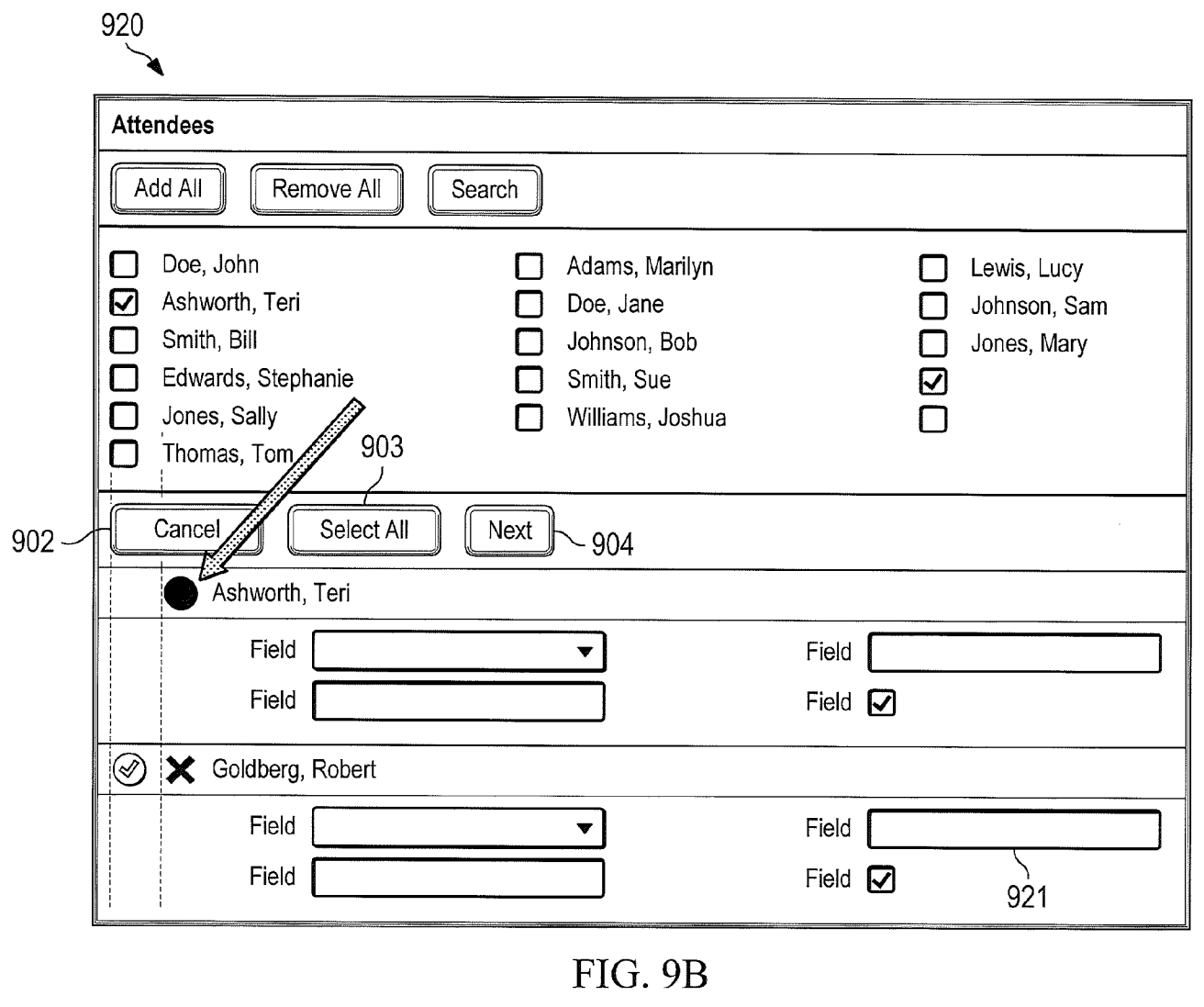

FIG. 9B illustrates an example UI 920 for recording mass samples according to one embodiment of the present invention. As shown, attendee specific fields 921 may be displayed for each attendee.

FIG. 10 illustrates an example UI 1000 for recording mass samples according to one embodiment of the present invention. The mass sampling UI 1000 may have a selected attendees section 1004 which displays attendees selected via the multi-select checkboxes 901 in FIG. 9A (e.g., Dr. Stephanie Edwards and Dr. Joshua Williams). Checkboxs may be deselected for quick removal of Attendee. The mass sampling UI 1000 may include an Add Attendee button 1005. A picklist of all attendees on the group call may be opened to allow the user to select more attendees for the mass sampling process when the Add Attendee button 1005 is clicked on. Attendees already selected may be grayed out on the picklist.

The mass sampling UI 1000 may include a Samples and Promotional Items area 1006. The user may enter sample related information in fields in the area 1006, e.g., types of the samples, lots numbers, quantity left, recipients and ship to addresses.

The mass sampling UI 1000 may have a header 1001 which may include the header name "Record Mass Samples", a Cancel button 1002, and a Save button 1003. The user may click on the Cancel button 1002 to close the mass sampling UI 1000 without saving and return to the parent call UI 520. When the user clicks on the Save button 1003, data captured on the mass detailing UI 1000 (e.g., types of the samples, lot numbers, quantity left, recipients and ship to addresses) may be stored in the customer relationship management subsystem 132, and applied to each of the selected attendees (e.g., Dr. Stephanie Edwards and Dr. Joshua Williams) on each respective child call so that their attendee specific information may be updated in the customer relationship management subsystem 132. The badges 601-604 shown in FIG. 6A may be updated accordingly.

Selecting the Media button 525 on the parent call UI 520 may allow the user to record unique media details and key messages for a subset of selected attendees on the group call. The Media button 525 may open a media presentation selection UI from which the user can select a digital media presentation to show the attendees. Media may be filtered based on restricted products for the group account, allowed products on territory specific field ("TSF") for the group account, and allowed products on the group call for the business account. After the user selects the presentation, the attendee selection wizard may be displayed, which is a multi-select picklist that displays a list of selected attendees. Data captured on the media presentation selection UI may be stored in the customer relationship management subsystem 132 and applied to each of the selected attendees (e.g., Dr. Stephanie Edwards and Dr. Joshua Williams) to update their information in the customer relationship management subsystem 132. Specifically, the subject product of the selected presentation may be added as a detailed product to the child call reports of the selected attendees. In addition, the key messages from displayed slides of the selected presentation may be added to the child call reports of the selected attendees. The badges 601-604 shown in FIG. 6A may be updated accordingly.

Using the Sign button 526 on the parent call UI 520 may allow the user to capture signatures for a subset of selected attendees on the parent call. The Sign button 526 may open an attendee selection wizard, which may display a single select picklist that displays a list of attendees selected for the parent call and a message: "SELECT ONE ATTENDEE TO SIGN". A signature UI may be provided for the user to enter signature related information and capture an attendee's signature. When the user clicks on an Accept button on the signature UI, signature data captured on the signature UI may be stored in the customer relationship management subsystem 132 and applied to the select attendee who signed (e.g., Dr. Stephanie Edwards) to update her information in the customer relationship management subsystem 132. The badges 601-604 shown in FIG. 6A may be updated accordingly.

Figure 11A:
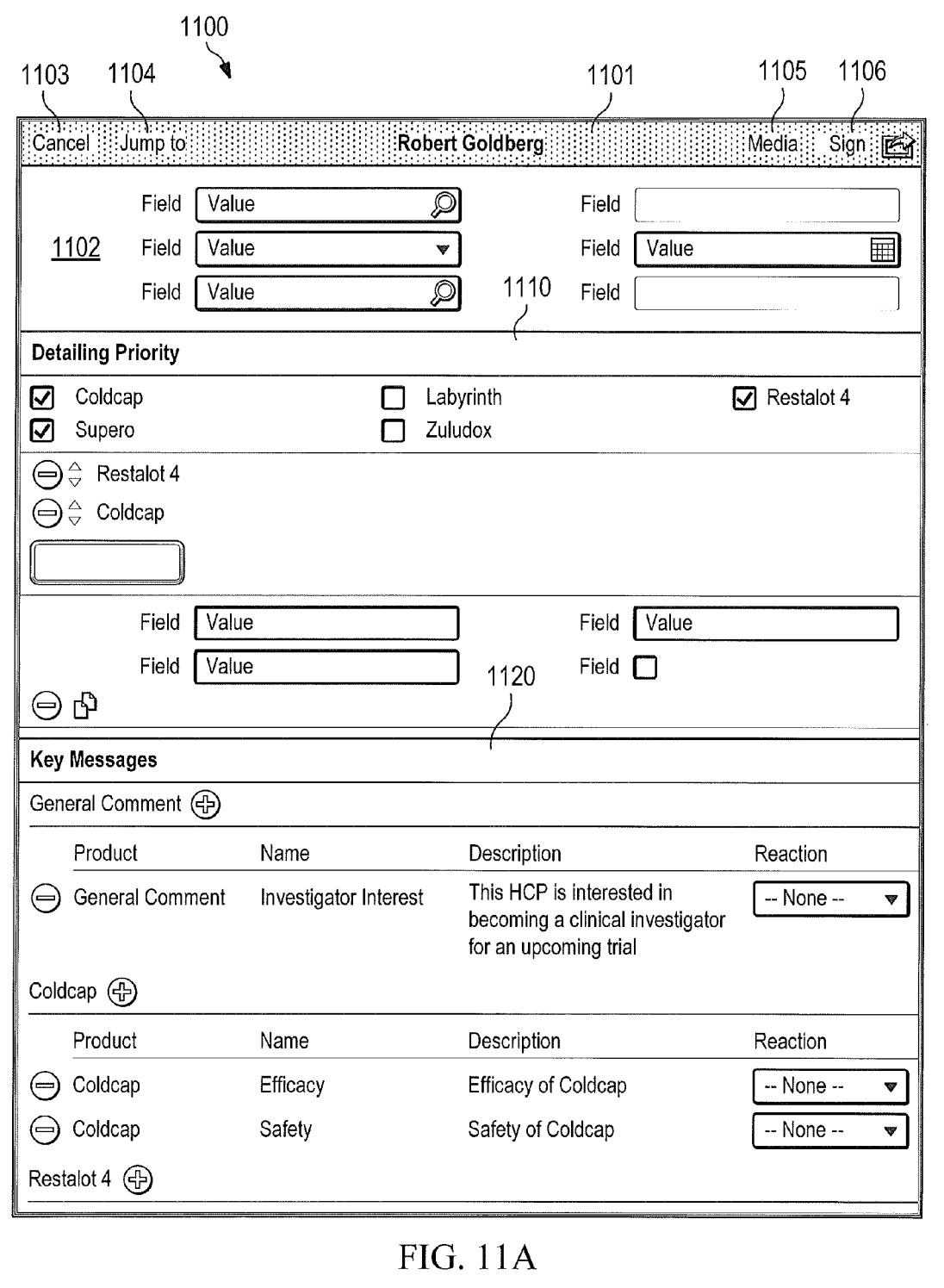

When the user selects the child call button 522 on the parent call UI 520, he may start to record a child report. FIG. 11A and FIG. 11B illustrate an example UI 1100 for a child call report according to one embodiment of the present invention. The child call report UI 1100 may be a standard edit window that opens on top of the parent call UI 520. The child call report UI 1100 may have a header 1101, which may include attendee name and actions such as cancel, jump to another selected attendee, media, and sign. When the user selects the "Cancel" button 1103, the child call may be closed and the user may be navigated back to the parent call UI 520. When the user selects the "Jump to" button 1104, he may be allowed to select another attendee. "Attendee name" displays the name of the attendee for the child call, e.g., Robert Goldberg. The "Media" button 1105 may navigate the user to a media selection screen. The "Sign" button 1106 may allow the user to enter signature information on the child call.

The header 1101 may also have other actions such as save, delete, new email, and new medical inquiry. The "Save" button may be used to save all changes to the child call report and navigate the user back to the parent call UI 520. The "Delete" button may be used to delete the child call report and navigate the user back to the parent call UI 520. The "Medical Inquiry" may open a new medical inquiry record for the attendee. The "Send Email" button may open a UI for email template selection.

The child call report UI 1100 may have fields 1102 for the user to enter information about the child call, e.g., date, time, duration, sample card number, sample card reason, sample send card, and supervising physician.

The child call report UI 1100 may have a detailing priority section 1110. The user may enter information about the subject product of the child call. The user may also remove or modify detailed products and detailing priority.

The child call report UI 1100 may have a key messages section 1120. The user may enter information about key messages, including the subject product, name of the key messages, description of the key messages (e.g., the product's efficacy and safety), and the attendee's reaction. The user may also remove or modify key messages.

The child call report UI 1100 may have a media section 1130. The system may record information about media shown during the child call with the attendee, e.g., presentation name, subject product, message, description, key messages, and the attendee's reaction. The user may remove or modify media information.

The child call report UI 1100 may have a call objectives section 1140. The user may enter information about call objectives, e.g., the six month checkpoint and the one year checkpoint for a product. The user may also remove or modify call objectives.

The child call report UI 1100 may have a samples and promotional items section 1150. The user may input information about samples or promotional items, such as products, lots, quantity left, ship to address, and recipients. The user may also remove or modify samples and promotional items.

When a child call report is saved, if there are one or more detailed products selected on the child call, the detail badge 601 may be displayed next to the attendee name, as shown in FIG. 6A. If there are one or more slides presented on the child call, the media badge 602 may be displayed. If there are one or more samples, or other promotional items selected on the child call, the sample badge 603 may be displayed next to the attendee name. If a signature is required on a child call, but has not yet been received, a signature required badge may appear next to the attendee name. If a signature has been captured on a child call, a signed badge may be displayed next to the attendee name.

Figure 12A:
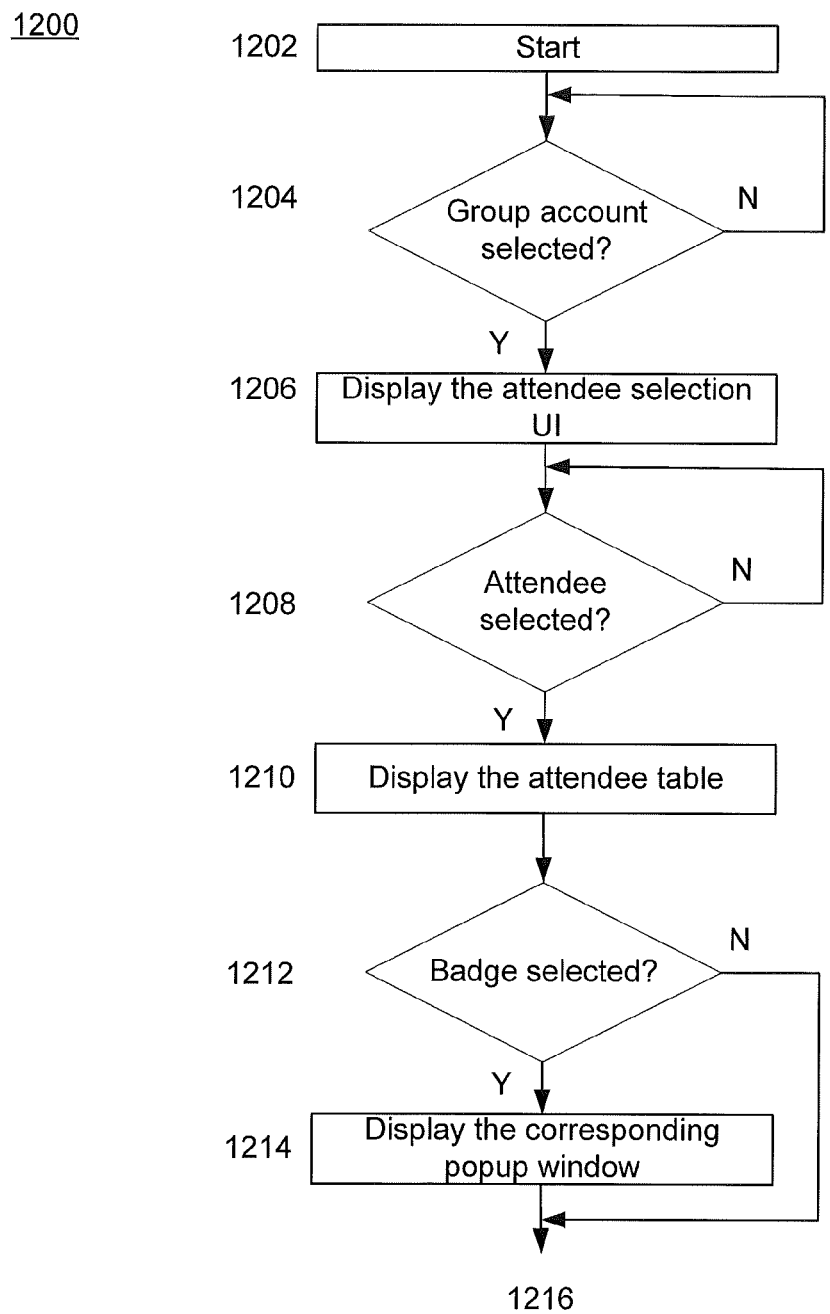
FIGS. 12A, 12B and 12C illustrate an example flowchart of a method for generating a call report according to one embodiment of the present invention.
Figure 12B:
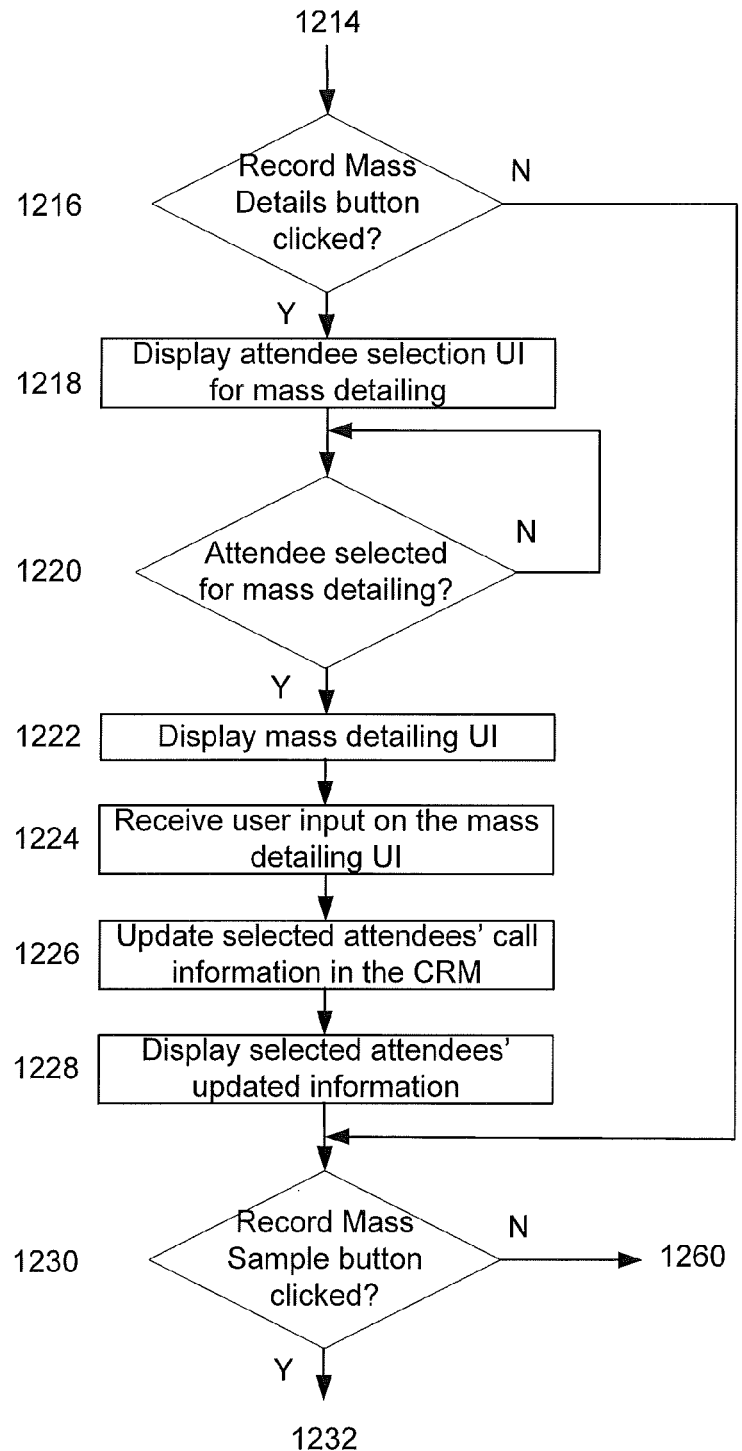
Figure 12C:
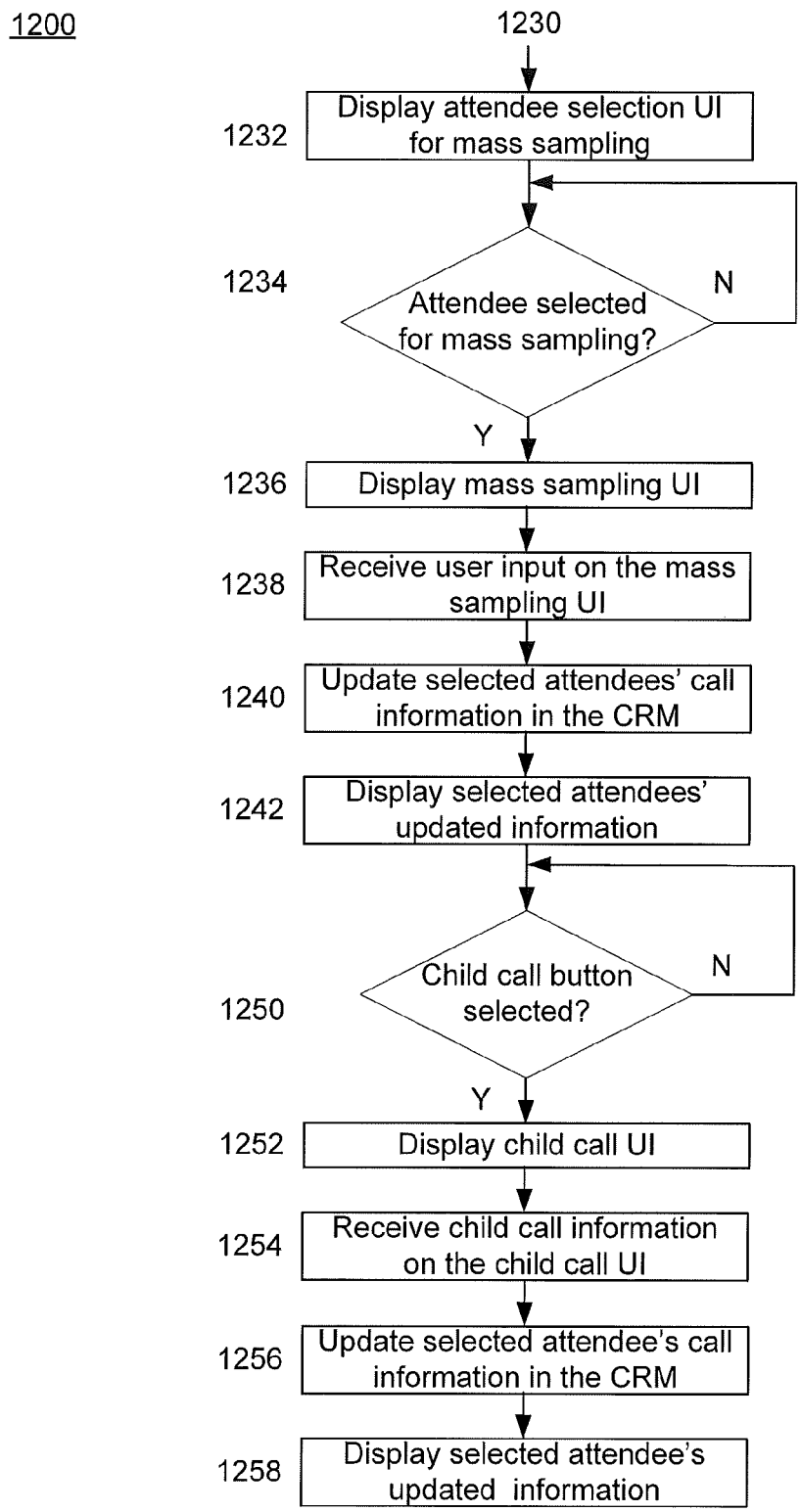

FIGS. 12A, 12B and 12C illustrate an example flowchart of a method for generating a call report according to one embodiment of the present invention. The process may be controlled by the group call controller 133. The process may start at 1202.

At 1204, it may be determined by the group call controller 133 if a user selected a group account from the customer relationship management subsystem 132 to start a call report.

If yes, at 1206, an attendee selection UI, e.g., the UI 500 shown in FIG. 5A, may be displayed.

At 1208, it may be determined by the group call controller 133 if a member of the group account is selected on the attendee selection UI.

If yes, at 1210, an attendees table may be displayed in, e.g., the attendees table area 521 shown in FIG. 5B or FIG. 6A.

At 1212, it may be determined by the group call controller 133 if there is any user input on the badge 601, 602, 603 or 604. If not, the process may proceed to 1216.

Otherwise, at 1214, popup windows for the detailed products, media shown, and samples left may be displayed, as shown in FIGS. 6B, 6C and 6D.

At 1216, it may be determined by the group call controller 133 if the Record Mass Details button 523 on the parent call UI 520 is clicked on. If not, the process may process to 1230.

Otherwise, at 1218, a user selection UI for the mass detailing process, e.g., the UI 700 shown in FIG. 7, may be displayed.

At 1220, it may be determined by the group call controller 133 if the user has selected one or more attendees to record mass details.

If yes, at 1222, a UI for recording mass details, e.g., the UI 800 shown in FIG. 8, may be displayed.

User input may be received on the UI for recording mass details at 1224.

At 1226, call information of attendees selected for the mass detailing process (e.g., Dr. Stephanie Edwards and Dr. Joshua Williams shown in FIG. 7A) in the customer relationship management subsystem 132 may be updated with the information received on the mass detailing UI.

At 1228, updated call information of attendees selected for the mass detailing process may be displayed, e.g., on the user interfaces 600, 620, 640 and 660 shown in FIGS. 6A to 6D.

At 1230, it may be determined by the group call controller 133 if the Record Mass Samples button 524 on the parent call UI 520 is clicked on. If not, the process may proceed to 1260.

Otherwise, at 1232, an attendee selection UI for the mass sampling process, e.g., the UI 900 shown in FIG. 9, may be displayed.

At 1234, it may be determined by the group call controller 133 if the user has selected one or more attendees to record mass samples.

If yes, at 1236, a UI for recording mass samples, e.g., the UI 1000 shown in FIG. 10, may be displayed.

Mass sampling information may be received at 1238.

At 1240, call information of attendees selected for the mass sampling process (e.g., Dr. Stephanie Edwards and Dr. Joshua Williams shown in FIG. 10) in the customer relationship management subsystem 132 may be updated with the information received on the mass sampling UI.

At 1242, updated call information of attendees selected for the mass sampling process may be displayed on, e.g., on the user interfaces 600, 620, 640 and 660 shown in FIGS. 6A to 6D.

At 1250, it may be determined by the group call controller 133 if the child call button 522 on the parent call UI 520 is clicked on.

If yes, at 1252, a UI for a child call, e.g., the UI 1100 shown in FIG. 11, may be displayed.

Information about a child call (e.g., with Dr. Robert Goldberg) may be received on the child call UI at 1254.

At 1256, account information of the attendee selected for the child call (e.g., Dr. Robert Goldberg shown in FIGS. 11A and 11B) in the customer relationship management subsystem 132 may be updated with the received child call information.

At 1258, updated call information of the attendee selected for child call (e.g., Dr. Robert Goldberg shown in FIGS. 11A and 11B) may be displayed, e.g., on the user interfaces 600, 620, 640 and 660 shown in FIGS. 6A to 6D. The process may then return to 1206.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for generating a call report, the method comprising:
    displaying an attendee selection user interface ("UI") in response to selection of a group account from a customer relationship management system, wherein the attendee selection user interface comprises two or more members who are associated with the group account, and wherein the customer relationship management system stores account information of each of the two or more members;
    in response to an input on the attendee selection user interface, displaying a first call user interface which displays a first and second attendees selected for the call, and a first button for the call, wherein the first and second attendees are selected from the two or more members;
    displaying a second call user interface in response to an input on the first button for the call, wherein the second call user interface comprises an area for receiving information unique to the first and second selected attendees, and wherein the information unique to the first and second selected attendees is about one or more products discussed during one or more meetings with the first and second selected attendees;
    capturing the information unique to the first and second selected attendees on the call; and
    sending the information unique to the first and second selected attendees to the customer relationship management system to update only the first and second selected attendees' call information in the customer relationship management system.

2. The method of claim 1, wherein the information unique to the first and second selected attendees comprises the one or more products' names.

3. The method of claim 1, wherein the information unique to the first and second selected attendees comprises priority of the one or more products.

4. The method of claim 1, wherein the information unique to the first and second selected attendees comprises a quantity of samples of the one or more products left to the first and second selected attendees.

5. The method of claim 1, wherein the information unique to the first and second selected attendees comprises media shown to the first and second selected attendees.

6. The method of claim 1, wherein the information unique to the first and second selected attendees comprises information about signatures acquired from the first and second selected attendees.

7. The method of claim 1, wherein the first call user interface comprises a button for starting a child call with a third selected attendee.

8. The method of claim 7, further comprising: displaying a first user interface for the child call, wherein the first user interface for the child call comprises an area for receiving information unique to the third selected attendee.

9. The method of claim 8, wherein the information unique to the third selected attendee comprises information about one or more products discussed during a meeting with the third selected attendee.

10. The method of claim 9, further comprising: updating only the third selected attendee's call information in the customer relationship management system with the information unique to the third selected attendee.

11. The method of claim 1, further comprising: configuring the second call user interface to display a field for receiving information specific to the first attendee.

12. The method of claim 1, further comprising: on the first call user interface, displaying attendee call information for the first selected attendee which summarizes meetings with the first selected attendee.

13. The method of claim 12, wherein the attendee call information comprises a first number representing at least one product discussed with the first selected attendee.

14. The method of claim 13, further comprising displaying a popup window when there is a user input on the first number, wherein the popup window displays the name of at least one product discussed with the first selected attendee.

15. The method of claim 12, wherein the attendee call information comprises a second number representing media shown to the first selected attendee.

16. The method of claim 12, wherein the attendee call information comprises a third number representing a quantity of a sample left to the first selected attendee.

17. The method of claim 12, wherein the attendee call information comprises a badge indicating if a signature of the first selected attendee is acquired.

18. A system for generating a call report, comprising:
    a group call controller for:
        displaying an attendee selection user interface ("UI") in response to selection of a group account from a customer relationship management system, wherein the attendee selection user interface comprises two or more members who are associated with the group account;

in response to an input on the attendee selection user interface, displaying a first call user interface which comprises a first and second attendees for the call, and a first button for the call, wherein the first and second attendees are selected from the two or more members;

displaying a second call user interface in response to an input on the first button for the call, wherein the second call user interface comprises an area for receiving information unique to the first and second selected attendees, and wherein the information unique to the first and second selected attendees is about one or more products discussed during one or more meetings with the first and second selected attendees;

capturing the information unique to the first and second selected attendees on the call; and sending the information unique to the first and second selected attendees to the customer relationship management system to update only the first and second selected attendees' call information in the customer relationship management system.

19. The system of claim 18 being a cloud based system.

20. A non-transitory computer-readable medium for generating a call report, the computer-readable medium comprising instructions that, when executed by a computer, cause the computer to:

display an attendee selection user interface ("UI") in response to selection of a group account from a customer relationship management system, wherein the attendee selection user interface comprises two or more members who are associated with the group account;

in response to an input on the attendee selection user interface, display a first call user interface which comprises a first and second attendees for the call, and a first button for the call, wherein the first and second attendees are selected from the two or more members;

display a second call user interface in response to an input on the first button for the call, wherein the second call user interface comprises an area for receiving information unique to the first and second selected attendees, and wherein the information unique to the first and second selected attendees is about one or more products discussed during one or more meetings with the first and second selected attendees;

capture the information unique to the first and second selected attendees on the call; and send the information unique to the first and second selected attendees to the customer relationship management system to update only the first and second selected attendees' call information in the customer relationship management system.

* * * * *